US011500618B2

(12) United States Patent
Rodgers et al.

(10) Patent No.: US 11,500,618 B2
(45) Date of Patent: Nov. 15, 2022

(54) SOFTWARE LIBRARY DIFFERENTIAL IDENTIFICATION AND AUTOMATED UPLIFT

(71) Applicant: Oracle International Corporation, Redwood Shores, CA (US)

(72) Inventors: Michael Patrick Rodgers, Lake Oswego, OR (US); Satish Chandra Oruganti, Bengaluru (IN); Shreyas Ravindranath, Bangalore (IN); Ganesh Kumar Gupta, Bangalore (IN)

(73) Assignee: Oracle International Corporation, Redwood Shores, CA (US)

(*) Notice: Subject to any disclaimer, the term of this patent is extended or adjusted under 35 U.S.C. 154(b) by 23 days.

(21) Appl. No.: 17/128,611

(22) Filed: Dec. 21, 2020

(65) Prior Publication Data
US 2022/0197606 A1    Jun. 23, 2022

(51) Int. Cl.
*G06F 8/36*       (2018.01)
*G06F 9/54*       (2006.01)
*G06F 8/71*       (2018.01)

(52) U.S. Cl.
CPC ............. *G06F 8/36* (2013.01); *G06F 8/71* (2013.01); *G06F 9/541* (2013.01)

(58) Field of Classification Search
None
See application file for complete search history.

(56) References Cited

U.S. PATENT DOCUMENTS

| | | | | |
|---|---|---|---|---|
| 2003/0191870 A1* | 10/2003 | Duggan | ............... | G06F 9/4488 719/331 |
| 2006/0143222 A1* | 6/2006 | Daniel | ...................... | G06F 8/70 707/999.102 |
| 2017/0371946 A1* | 12/2017 | Kota | ................... | H04L 67/1095 |
| 2020/0202007 A1* | 6/2020 | Nagaraja | ............ | G06F 11/3684 |

OTHER PUBLICATIONS

Brito, "APIDiff: Detecting API Breaking Changes", 2018, IEEE (Year: 2018).*
Raemaekers, "Semantic Versioning versus Breaking Changes: A Study of the Maven Repository", 2014, IEEE (Year: 2014).*

(Continued)

*Primary Examiner* — Hossain M Morshed
(74) *Attorney, Agent, or Firm* — Kilpatrick Townsend & Stockton LLP

(57) ABSTRACT

A library uplift tool may automatically identify changes to elements of an between different versions of a software library interface. The public interfaces of the two versions may be compared to identify changes to datatypes, variable or function names, parameter names, parameter lists, and other elements of the library interface. Locations in application source code using the software library may then be identified and linked with the changes between the library versions. A report or user interface may then display specific locations in the application source code that are affected by the changes to the library versions. For each change, a suggested action may be presented in the interface, and an example of modified source code may be generated. The interface may be interactive such that modified source code may be automatically propagated to source code files for compatibility with the new library version.

20 Claims, 15 Drawing Sheets

(56) References Cited

OTHER PUBLICATIONS

Barr, "Safe Upgrading without Restarting", 2003, Proceedings ICSM'03, pp. 129-137, 2003 (Year: 2003).*
Jezek, "How Java APIs break—An empirical study", 2015, ScienceDirect (Year: 2015).*
Dietrich, "Broken Promises: An Empirical Study into Evolution Problems in Java Programs Caused by Library Upgrades", 2014, IEEE (Year: 2014).*
Huang, "Up-To-Crash: Evaluating Third-Party Library Updatability on Android", 2019, IEEE (Year: 2019).*

* cited by examiner

LIBRARY – Version 1.1 — 102

CJDEColumn::CJDEColumn(class CJDENamedID const &)
CJDEColumnGridCtrl::CJDEColumnGridCtrl(void)
int CJDETrace::m_TraceLevel
bool AuditConfigStore::m_bF9500001Checked
string GetOMWSaveDirName(int,bool,CJDECommandLine*)
bool InitJDEPPDLL()
struct tagDBREF_B9_SPE JDEUDCAccess::m_dbRef_F0005
void * CJDEDocument::m_hThreadHandle
class CProcessingDlg * CProcessingDlg::m_theDlg
void CJDEDataItem::setIsRuntimeLoad(bool)
void CallTipoftheDay
int GetIJDEPPInterface(int,LONG,bool)
int GetJDEPPArgumentsList(JCHAR*,int,bool)
...

LIBRARY – Version 2.6 — 202

CJDEColumn::CJDEColumn(class CJDENamedID const &)
CJDEColumnGridCtrl::CJDEColumnGridCtrl(void)
LONG CJDETrace::m_TraceLevel
bool AuditConfigStore::m_bF9500001Checked
string GetOMWSaveDirNameEx(int,bool,CJDECommandLine*)
**CJDEPP\* InitJDEPPDLL()**
struct tagDBREF_B9_SPE JDEUDCAccess::m_dbRef_F0005
void * CJDEDocument::m_hThreadHandle
**class CBitmap \* CJDECellType::m_pPictEnabledUp**
**class CBitmap \* CJDECellType::m_pPictEnabledDown**
class CProcessingDlg * CProcessingDlg::m_theDlg
void CJDEDataItem::setIsRuntimeLoad(bool)
void CallTipoftheDay(bool)
int GetIJDEPPInterface(int,LONG)
int GetJDEPPArgumentsList(JCHAR*,LONG,bool)
...

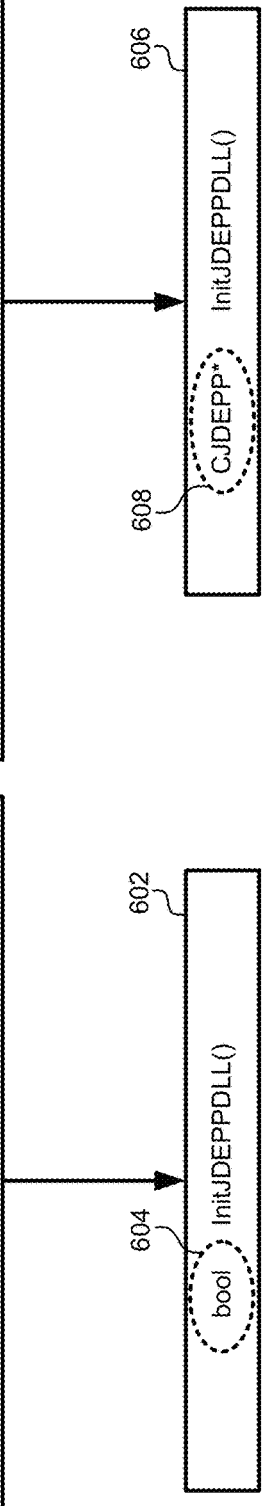

604 — (bool) InitJDEPPDLL()  — 602

608 — (CJDEPP*) InitJDEPPDLL()  — 606

FIG. 6

LIBRARY – Version 1.1 — 102

```
CJDEColumn::CJDEColumn(class CJDENamedID const &)
CJDEColumnGridCtrl::CJDEColumnGridCtrl(void)
int CJDETrace::m_TraceLevel
bool AuditConfigStore::m_bF9500001Checked
string GetOMWSaveDirName(int,bool,CJDECommandLine*)
bool InitJDEPPDLL()
struct tagDBREF_B9_SPE_JDEUDCAccess::m_dbRef_F0005
void * CJDEDocument::m_hThreadHandle
class CProcessingDlg * CProcessingDlg::m_theDlg
void CJDEDataItem::setIsRuntimeLoad(bool)
void CallTipoftheDay
int GetIJDEPPInterface(int,LONG,bool)
int GetJDEPPArgumentsList(JCHAR*,int,bool)
...
```

LIBRARY – Version 2.6 — 202

```
CJDEColumn::CJDEColumn(class CJDENamedID const &)
CJDEColumnGridCtrl::CJDEColumnGridCtrl(void)
LONG CJDETrace::m_TraceLevel
bool AuditConfigStore::m_bF9500001Checked
string GetOMWSaveDirNameEx(int,bool,CJDECommandLine*)
CJDEPP* InitJDEPPDLL()
struct tagDBREF_B9_SPE_JDEUDCAccess::m_dbRef_F0005
void * CJDEDocument::m_hThreadHandle
class CBitmap * CJDECellType::m_pPictEnabledUp
class CBitmap * CJDECellType::m_pPictEnabledDown
class CProcessingDlg * CProcessingDlg::m_theDlg
void CJDEDataItem::setIsRuntimeLoad(bool)
void CallTipoftheDay(bool)
int GetIJDEPPInterface(int,LONG)
int GetJDEPPArgumentsList(JCHAR*,LONG,bool)
...
```

702 — string GetOMWSaveDirName(int,bool,CJDECommandLine*) — 704

706 — string GetOMWSaveDirNameEx(int,bool,CJDECommandLine*) — 708

FIG. 7

LIBRARY – Version 1.1 (102)

CJDEColumn::CJDEColumn(class CJDENamedID const &)
CJDEColumnGridCtrl::CJDEColumnGridCtrl(void)
int CJDETrace::m_TraceLevel
bool AuditConfigStore::m_bF9500001Checked
string GetOMWSaveDirName(int,bool,CJDECommandLine*)
bool InitJDEPPDLL()
struct tagDBREF_B9_SPE JDEUDCAccess::m_dbRef_F0005
void * CJDEDocument::m_hThreadHandle
class CProcessingDlg * CProcessingDlg::m_theDlg
void CJDEDataItem::setIsRuntimeLoad(bool)
void CallTipoftheDay
int GetJDEPPInterface(int,LONG,bool)
int GetJDEPPArgumentsList(JCHAR*,int,bool)
...

LIBRARY – Version 2.6 (202)

CJDEColumn::CJDEColumn(class CJDENamedID const &)
CJDEColumnGridCtrl::CJDEColumnGridCtrl(void)
LONG CJDETrace::m_TraceLevel
bool AuditConfigStore::m_bF9500001Checked
**string GetOMWSaveDirNameEx(int,bool,CJDECommandLine*)**
**CJDEPP* InitJDEPPDLL()**
struct tagDBREF_B9_SPE JDEUDCAccess::m_dbRef_F0005
void * CJDEDocument::m_hThreadHandle
**class CBitmap * CJDECellType::m_pPictEnabledUp**
**class CBitmap * CJDECellType::m_pPictEnabledDown**
class CProcessingDlg * CProcessingDlg::m_theDlg
void CallTipoftheDay(bool)
int GetJDEPPInterface(int,LONG)
int GetJDEPPArgumentsList(JCHAR*,LONG,bool)
...

int GetJDEPPInterface(int,LONG, bool ) (802, 804)

int GetJDEPPInterface(int,LONG) (806)

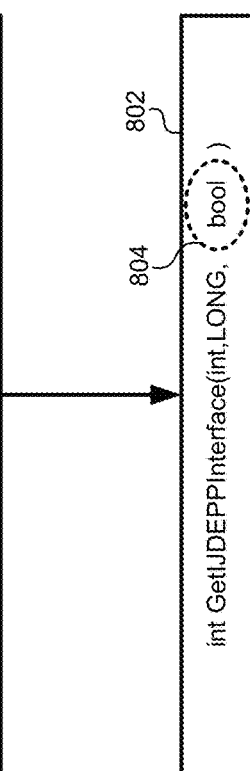

FIG. 8

| Source | Original | Diff | Target | New |
|---|---|---|---|---|
| Library A | int CJDETrace::m_TraceLevel | Global Exported Variable Signature Modification | Library B | LONG CJDETrace::m_TraceLevel |
| Library A | string GetOMWSaveDirName(int,bool,CJDECommandLine*) | Function Removed | Library B | string GetOMWSaveDirNameEx(int,bool,CJDECommandLine*) |
| Library A | Not Applicable | Global Exported Variable Added | Library B | class CBitmap * CJDECellType::m_pPictEnabledUp |
| Library A | bool InitJDEPPDLL | Function Return Type Modification | Library B | CJDEPP* InitJDEPPDLL |
| Library A | Not Applicable | Global Exported Variable Added | Library B | class CBitmap * CJDECellType::m_pPictEnabledDown |
| Library A | int GetJDEPPInterface(int,LONG,bool) | Function Parameter Removed | Library B | int GetJDEPPInterface(int,LONG) |
| Library A | void CallTipoftheDay() | Function Parameter Added | Library B | void CallTipoftheDay(bool) |
| Library A | int GetJDEPPArgumentsList(JCHAR*,int,bool) | Function Parameter Modification | Library B | int GetJDEPPArgumentsList(JCHAR*,LONG,bool) |

FIG. 11

SOFTWARE LIBRARY DIFFERENTIAL IDENTIFICATION AND AUTOMATED UPLIFT

BACKGROUND

Modern software applications may integrate multiple reusable software components into their source code. These software applications may include libraries that are sourced from various third parties or other entities that specifically provide a particular functionality or solve a particular problem. These libraries may perform different tasks for the software application and may provide a pathway for rapidly completing software code bases by reusing existing code. Generally, libraries are thoroughly tested and supported by the library providers. Given the complexity of modern software applications, using library functionality has become a very beneficial way of enhancing software functionality while minimizing design time.

Because software libraries are often sourced from different entities than the software applications that use the software libraries, the development and upgrade cycle for applications and libraries are often very different. Applications may be upgraded and replaced at different times than versions of the software library are updated and release. When a new version of the software library is released, the new version may include bug fixes and other enhancements that should be integrated into existing software applications that use the software libraries. However, while many changes in a new version of the software library may be internal, some changes may affect the external interface of the software library. When the interface changes, the application that calls the library functions and/or uses library variables may be required to update the syntax of the actual application code to conform with the updated syntax of the library interface. The difficulty of this process often prevents software application developers from integrating new versions of software libraries into existing applications, which may lead to a lack of software support, deprecated functionality, and continued problems with existing bugs. There is no reliable way to upgrade a software application for a new version of a software library between upgrades and releases of the software application itself. This problem is compounded when the application is finally upgraded after multiple releases of new versions of a software library. Therefore, improvements in the art are needed.

SUMMARY

The embodiments described herein relate to a library uplift tool that automatically identifies changes to elements of an interface of a software library between versions, identifies source code locations in applications that are affected by these changes, and automatically generates modified source code to make the application compatible with a later version of the software library. Changes to the public interface of a version of the software library may include changes to the data types of exported variables or constants; changes to classes or other structural definitions; changes to return types for functions, methods, procedures, or routines; changes to parameters in function calls that are added, removed, or modified; along with other syntactical changes to the public interface. In order to make an existing application compatible with an upgraded version of a software library, the actual source code of the software application may need to be modified to match the new public interface provided by the upgraded version of the library.

The library uplift tool may access an existing version of the software library and a new version of the software library as inputs. The tool may then identify changes in the public interface of the software library. These changes may be identified by virtue of metadata, comments, documentation, or other information provided with the software library providing details of how the interface may have changed between versions. These changes may also be identified by extracting strings or symbols from the library interface and comparing the versions of these interfaces. Differences may be identified using approximate string matching, name mangling, and other techniques for dealing with overloaded function names and matching variable names between the two versions of the library. These changes may be identified for any two library versions, even when multiple versions have been released between the two versions of the library being analyzed.

After identifying elements in the interface of the software library that have changed between versions, the tool may access the actual source code files for application that use the previous version of the software library. The tool may analyze the source code files to identify locations where the changed element in the library interface may affect the application source code. For example, if a function signature has changed in the interface of the library by adding or removing parameters, instances in the source code of the application may be identified where the source code calls the library function. The tool may then generate indications of the precise locations in the application source code that are affected by the changes identified between the library versions.

A report or display may be generated in a user interface that can be used to view and managed the changes to the application source code that may be needed for the application to be compatible with the new version of the software library. The report may include locations in the source code affected by the changes, the actual syntax used in the source code, a summary of the type of change in the library that affects the source code, suggested actions that may be taken to make the source code compatible with the new version of the software library, and/or modified source code generated according to the suggested actions. For example, when a parameter is added to a function in the new version of the library, the report may list filenames and line numbers in the application source code that call the function, the source code syntax calling the function in the existing application code, a description indicating that a new parameter has been added to the function, a suggested action that adds a default value for the new parameter to the existing function calls, and modified code that can be inserted into the application source code. The report may be interactive, allowing the user to adjust the default value, approve or change modified source code provided by the report, and propagate changes to single instances in the source code or to multiple instances in the source code automatically.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates an example of a function for which the return type has been modified, according to some embodiments.

FIG. 7 illustrates an example of a function that has either been removed or undergone a name change in the second version of the software library, according to some embodiments.

FIG. 8 illustrates an example of a function that has changed aspects of the function parameters, according to some embodiments.

FIG. 11 illustrates a report that may be generated without reference to the source code for a specific application, according to some embodiments.

DETAILED DESCRIPTION

Figure 1:
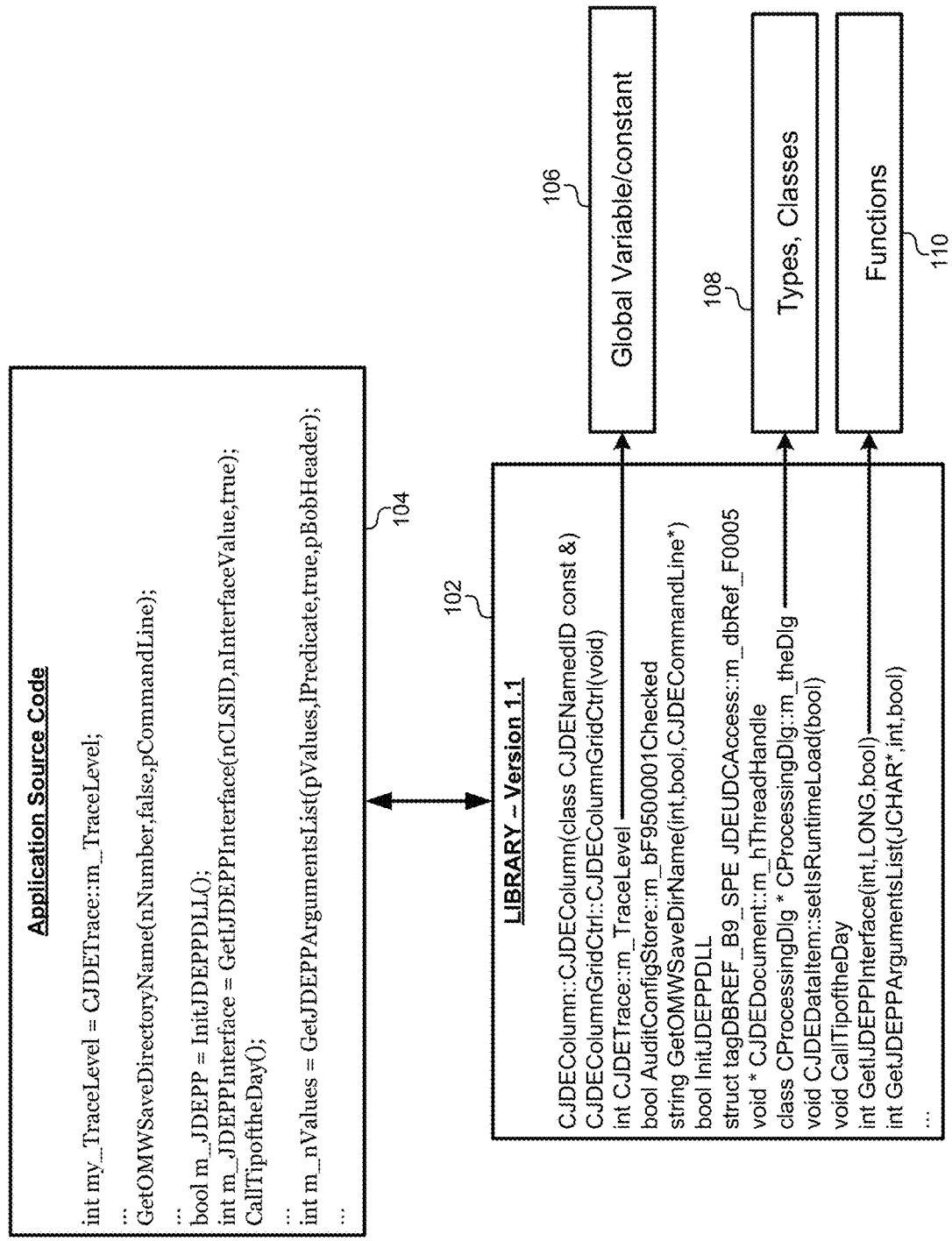
FIG. 1 illustrates a software application that uses a first version of software library, according to some embodiments.

FIG. 1 illustrates a software application that uses a first version of software library 102, according to some embodiments. The software application may be part of an application suite that is deployed to a cloud environment for a tenant. The tenant may allow a plurality of the tenants users to use the application as it is hosted in the cloud environment. Alternatively, the application may be part of a software suite that is installed on-premise as part of an enterprise software system. For example, the application may interact with local databases and other applications to manage, store, analyze, and present data related to an organization. In other embodiments, the application may be a standalone application that is executed at a client device. Other embodiments may allow the application to be executed as a script in a browser or other online environment.

The application may include application source code 104 that is compiled and executed/interpreted in an operating environment. The application source code may be "managed code" that executes in a managed environment, such as a Common Language Infrastructure (CLI), a Virtual Execution System (VES), a virtual machine, and so forth. Examples may include Java code executing on a Java Virtual Machine (JVM); code executing on a .NET core, CoreFX, or .NET Framework; or code executing in a Common Language Runtime (CLR). The managed code may be a compiler output of the source code 104 written in a high-level programming language, such as C#, J #, Visual Basic.NET, or Java. In other embodiments, the application source code 104 may include script code that is executed on a scripting platform. For example, the application source code 104 may include JavaScript deployed as .js files. Still other embodiments may use native or unmanaged code such as C or C++. Unmanaged code may execute outside of a specific environment or runtime, and may execute as machine code after being compiled.

The application may use functions, utilities, variables, constants, or other elements of a software library. FIG. 1 illustrates a first version of a software library 102. Software libraries may be versioned using numerical identifiers, such as version 1.1, version 1.2, version 2.0, and so forth. The first version of the software library may include global variables and/or constants 106; types, classes, or other software structures 108; functions, procedures, method, or other routines 110; and other elements that may be compiled into a standard software library. The software library may exist as a "black box" such that the internal functionality of the functions, procedures, routines, and other elements are not exposed to the application. Instead, a public interface of the software library may be provided that lists function signatures, variable declarations, constant values, and/or other elements of the library that may then be used by the application. For example, listing a function signature that includes a return type, a function name, and a list of parameters allows the application to call that function without access to the internal operations or functionality associated with those functions. As used herein, the term "interface" of the software library includes the public declarations and listings of elements of the software library that are made available to the application source code 104.

The first version of the software library 102 may be provided from a source that is different from the source that provides the application source code 104. For example, software libraries may be made publicly available for download and use in software applications developed by different developers. The interface for the library may provide all of the information needed to interact with the functionality of the library. This allows the library to be modular, such that it is not tied to a particular operating environment or type of source code. For example, the application source code 104 and the programming language used to generate the first version of the software library 102 may be very different. Therefore, the software library and the application may be part of very different distribution schedules, maintenance schedules, upgrade schedules, and so forth. The software library may be used with a number of different applications, and an application may use a number of different software libraries from different library developers.

In the example of FIG. 1, the application source code 104 may use the declarations of functions, variables, classes, and other elements in the first version of the software library 102 in the application source code 104 itself. For example, the application source code 104 may use constants, reference global variables, instantiate objects using class or structure definitions in the library, and/or call functions and procedures that are made available in the first version of the software library 102. The application source code 104 may include calls to functions that provide values for the parameters declared in the interface of the first version of the software library 102. Thus, the syntax of the high-level software language used in the application source code 104 may be based on the guidance provided in the public interface of the first version of the software library 102.

Figure 2:
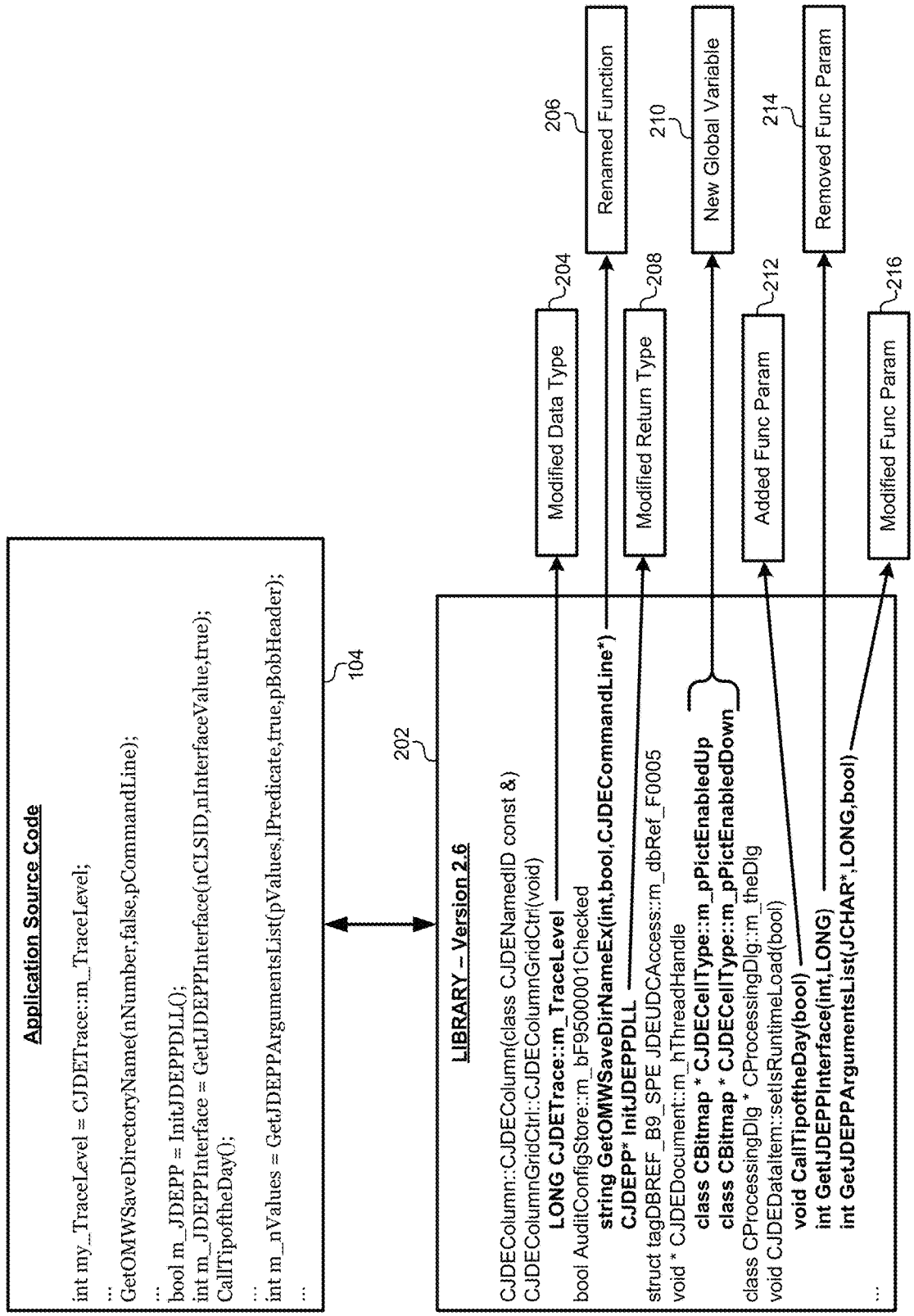
FIG. 2 illustrates how the same application can use a second version of the software library, according to some embodiments.

FIG. 2 illustrates how the same application can use a second version of the software library 202, according to some embodiments. The first version of the software library 102 and the second version of the software library 202 may be different versions of the same library. The library versions may have the same name and may be distributed from the same software developer or source. Typically, many of the elements of the software library are unchanged between versions to maintain backwards compatibility. For example, the internal implementation and/or functionality of some of the functions provided by the software library may change without affecting the external interface made available to applications. However, when a software library is upgraded from one version to a subsequent version, changes may also take place in the interface of the software library.

In the example of FIG. 2, the second version of the software library 202 may include a number of changes to the interface in comparison to the first version of the software library 102 in FIG. 1. For example, a data type for a global variable exported by the software library may be modified (204). A function may be renamed (206). Note that a renamed function may also be considered a function that has been deleted from the first version of the software library 102 and replaced with a new function in the second version of the software library 202. Other changes to elements in the interface of the software library may include a modified return type for a function (208), addition of a new global variable or constant (210), changes to the parameters of a function or procedure, and/or any other syntactical changes to the interface. For example, parameters may be added (212), removed (214), and/or have their name or data type modified (216). The second version of the software library 202 illustrates these changes in FIG. 2 in comparison to the first version of the software library 102 in FIG. 1.

A technical problem is created in the field of deploying and maintaining software applications and software libraries when software libraries are upgraded to new versions. When elements of a software library are changed in the public interface, the actual application source code 104 may also need to change to match the new syntax in the latest version of the software library. For example, if a parameter is added to a function in the second version of the software library 202, each instance in the application source code 104 that calls that function may need to be altered to include the new parameter. If the application source code 104 is not updated correctly, executing the application may result in run-time errors or other software faults that prevent the application from running correctly.

This problem is exacerbated when multiple versions of the software library are released before they are incorporated into the application. As used herein, the terms "first" and "second" are used merely to distinguish one version of the software library from another version of the software library. These terms do not imply that the second version is an immediate upgrade of the first version. For example, multiple upgrades or versions may be released and made publicly available between the first version and the second version as used herein. This presents another complication in upgrading the source code. Simply upgrading from one version to the next version of a software library may include metadata or instructions for updating the application source code 104. However, skipping intermediate versions of the software library can make it nearly impossible to update the application source code 104 correctly unless the application source code 104 is updated incrementally with each intermediate version of the software library.

Figure 3:
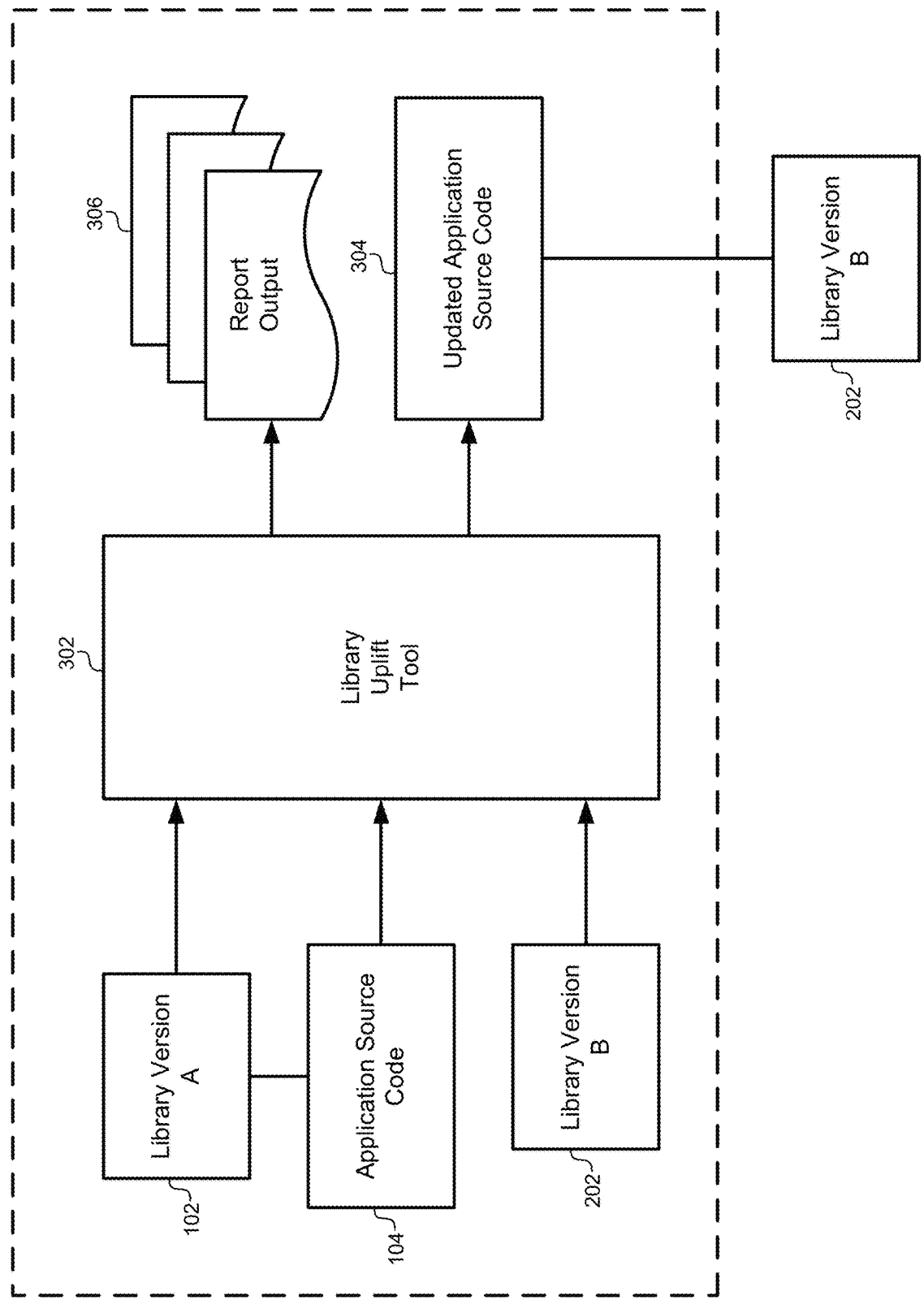
FIG. 3 illustrates a block diagram of a system for automatically uplifting a new version of a software library for existing source code, according to some embodiments.

The embodiments described herein solve these and other technical problems by automatically analyzing changes between two versions of a software library, identifying locations in the application source code that are affected by these changes in the software library, and automatically generating code modifications in the application source code to accommodate changes between any two versions of the software library. FIG. 3 illustrates a block diagram of a system for automatically uplifting a new version of a software library for existing source code, according to some embodiments. As used herein, the term "uplift" may refer to the process of receiving a new version of the software library and integrating the new version of the software library with an existing application source code, including automatically generating and implementing changes to the existing application source code. The library uplift tool 302 may automate this process to automatically generating modified/updated application source code and interactive reports that can be used to view and implement changes in the application source code.

The library uplift tool 302 may receive inputs including the application source code 104 and a first version of the software library 102 as described above. The application source code 104 may have syntax that is configured to be compatible with the first version of the software library 102 when it is provided as an input to the library uplift tool 302. A second version of the software library 202 may also be provided as an input to the library uplift tool 302. In some embodiments, the compiled code for the first version of the software library 102 and/or the second version of the software library 202 need not be provided to the library uplift tool 302; instead, library uplift tool 302 may receive the public interface of these versions of the software library.

The library uplift tool 302 may perform an algorithm described in detail below to identify changes in elements of the interface of the software library between the first version of the software library 102 and the second version of the software library 202. The library uplift tool 302 may then access the application source code 104 and identify locations in the application source code 104 that are affected by the changes between the versions of the software library. For example, the library uplift tool 302 may identify locations where library functions are called or library constants/variables are used in the application source code 104.

After identifying the locations in the source code where the source code uses the elements that have changed in the software library, the library uplift tool 302 may generate an indication of these locations in the application source code 104. For example, one or more reports 306 may be generated as an output by the library uplift tool 302. The reports 306 may list elements in the software library that have changed between versions, a characterization of the changes, suggested actions that may be taken to change the syntax of the application source code 104 such that it is compatible with the second version of the software library 202, and/or resulting modified source code that would result from the suggested actions. The reports 306 may be interactive, such that they allow the user to accept/reject the suggested actions in the reports 306 and to propagate those changes throughout the application source code 104. Therefore, the library uplift tool 302 may generate updated application source code 304 that is now compatible with the second version of the software library 202.

The library uplift tool 302 solves the complex technical problem of upgrading the application source code 104 to be compatible with new versions of the software library. This represents a new practical application of a number of different concepts in the field of computer science. It should be emphasized that this process is not one that could be practically performed by a human using pencil and paper. Modern software applications include tens of thousands of lines of source code that are spread between hundreds of different files, classes, and modules. Even using modern search/replace functions would not identify changes such as renamed, deprecated, or new function signatures or parameters. Furthermore, properly identifying a changed function in the application source code may include parsing the different data types to identify overloaded functions, which is not possible using search/replace tools. Performing this operation by hand would require a human to analyze each line of code that may be affected by the changes to the elements of the software library, which would require hundreds of hours at the least. Additionally, it is not practical for human users to identify types of changes between software library versions that are not sequential, as the documentation for such versions typically only covers changes from the immediate previous version of the software library.

Figure 4:
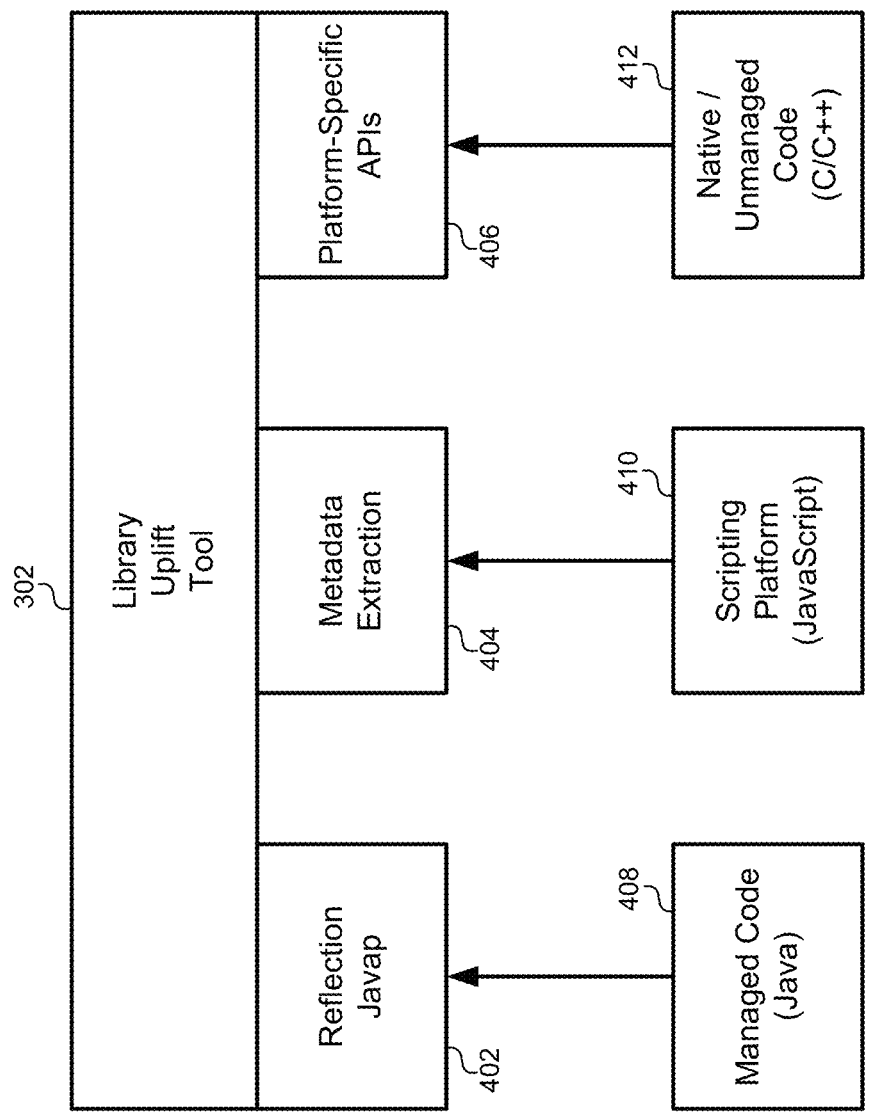
FIG. 4 illustrates a block diagram of how the library uplift tool 302 may identify elements in the software library that have changed for libraries using different languages and/or programming environments, according to some embodiments.

FIG. 4 illustrates a block diagram of how the library uplift tool 302 may identify elements in the software library that have changed for libraries using different languages and/or programming environments, according to some embodiments. As described above, the application source code 104 may be written in any of a number of different programming languages and executed in corresponding different computing environments, including Fireman's for managed code, unmanaged code, scripting platforms, and so forth. Similarly, the software libraries may be written in a number of different programming languages meant for the different operating environments. For example, the software application may be written for a scripting platform using JavaScript, a software library may use managed code, and another software library may use unmanaged code. One of the advantages of using software libraries is that libraries written in different programming languages may be used interchangeably with any software application.

The library uplift tool 302 may include utilities that are configured to handle software libraries comprising different types of code. For example, a managed code utility 402 may be configured to read a software library 408 that use managed code, such as Java. The managed code utility 402 may utilize functions such as Java class reflection and/or a class file disassembler such as Javap. These utilities may be provided by the Java Platform to extract metadata about the methods provided by the software library. For example, function signatures may be returned, along with numbers and types of arguments and a return type for a function. These utilities may also return constants and other exposed features of classes contained in the software library.

The library uplift tool 302 may also include a scripting code utility 404 that is configured to read versions of software libraries that use scripting code for execution on scripting platforms. For example, a software library 410 using JavaScript or another scripting language may be handled by the scripting code utility 404, which may extract metadata from the functions, constants, etc., using exported modules from the js files of the script.

Library uplift tool 302 may also include an unmanaged code utility 406 that is configured to read versions of software libraries that use native or unmanaged code. A software library 412 using a native or unmanaged programming language such as C/C++ may be processed by using a platform dependent Application Programming Interface (API) to access the exported symbols of the C/C++ library and to extract method and/or function signature information. For example, in Microsoft Windows the portable executable (PE) header may be parsed to identify a location of an export table. The unmanaged code utility 406 may use compiler techniques such as name mangling and/or name decoration of the functions to determine a type and number of any parameters added or modified in the function signature.

Note that the code utilities 402, 404, 406 described above are provided merely by way of example and are not meant to be limiting. A similar approach may apply to libraries of other programming languages that may or may not fit within the categories described above. However, a software designer may use the principles described above in this disclosure to design a utility that would work for any programming language that does not specifically fit in one of the categories described above.

After processing the first version of the software library and the second version of the software library, the library uplift tool may identify elements in the interfaces of the software libraries that have changed. At this point, the library uplift tool may have parsed the interfaces for the software libraries to identify strings or other symbols that represent the variables, constants, functions, classes, methods, and/or other elements as described above. The library uplift tool may then analyze the two interfaces to identify differences in the strings/symbols representing these elements to identify changes between the two versions of the software library.

Figure 5:
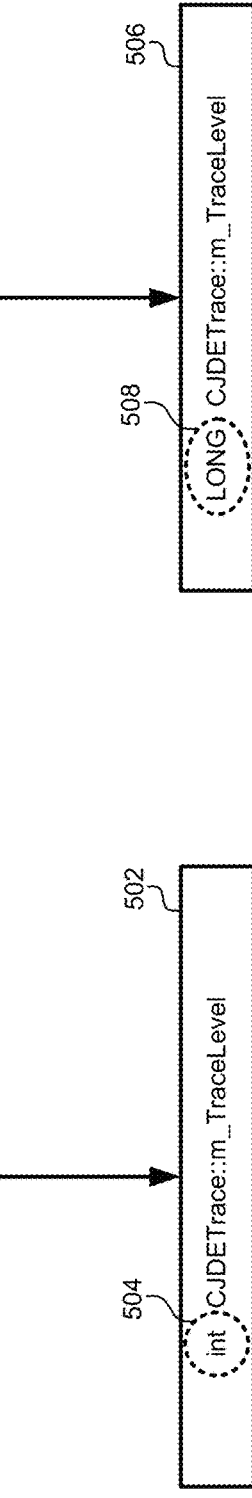
FIG. 5 illustrates an example of an exported variable for which the data type has been modified, according to some embodiments.

FIG. 5 illustrates an example of an exported variable for which the data type has been modified, according to some embodiments. In this example, the exported variable m_TraceLevel has had its data type changed between the versions of the software library. Specifically, the data type 504 for the variable 502 in the first version of the software library 102 has changed from "int" to "LONG" in the data type 508 of the variable 506 in the second version of the software library 202. This change may be detected by identifying variables having the same name in both versions of the software library and comparing their data types. When the data type is different for a variable having the same name the difference in the data type for that same variable may be noted and indicated as a change in the interface of the software library between the two versions.

FIG. 6 illustrates an example of a function for which the return type has been modified, according to some embodiments. In this example, the function InitJDEPPDLL( ) has had a change in its return type between the versions of the software library. Specifically the return type 604 of the function 602 in the first version of the software library 102 has changed from "bool" to "CJDEPP *" in the return type 608 of the function 606 in the second version of the software library 202. This change may be detected by identifying functions having the same name and parameter list that have different return types in the two versions of the software library. This change in the return type for the same function with the same parameter list may be indicated as a change in the interface of the software library between the two versions.

FIG. 7 illustrates an example of a function that has either been removed or undergone a name change in the second version of the software library, according to some embodiments. In this example, the library uplift tool may consider the change to the name of a function in two ways. First, for each function name in the first version of the software library 102, the tool may search the second version of the software library 202 for a function with the identical name. If no function is found, the change may be classified as a function being removed in the second version of the software library 202. The tool may search the second version of the software library 202 for a function with the same parameter list (e.g., same parameter names and data types) that has a similar name. For example, a fuzzy string matching algorithm may be used to identify a function 706 having a similar name 708 within a threshold distance of the name 704 of the function 702 that is no longer present in the second version of the software library 202. The tool may then present an indication that function 702 has been renamed as depicted in function 706.

Alternatively, the tool may identify the function 702 as being deprecated or removed from the software library. In this case, the search for a similar function may be described as a search for a replacement function that may be used in the place of the deprecated function 702. The same approximate string-matching outer the may be used to identify the function 706 as a replacement function. Note that functions having similar names and/or similar parameter lists may be used as replacement functions. Alternatively, some embodiments may examine the metadata, documentation, or comments in the second version of the software library 202. Many software library updates may include metadata, documentation, and/or comments that list functions that have been deprecated, along with replacement functions that may be used in their place. The tool may use this information to identify renamed, deprecated, and replacement functions, and may present the results in the report and user interface described below.

FIG. 8 illustrates an example of a function that has changed aspects of the function parameters, according to some embodiments. The tool may detect function signatures that add, remove, or change parameter types in a new version of the software library. In the example of FIG. 8, a function 802 in the first version of the software library 102 may include three parameters, the last parameter 804 having a data type of "bool." In the second version of the software library 202, the function 806 may remove the last parameter 804 from the parameter list. Although not illustrated explicitly in FIG. 8, the same identification process may be used to identify a function with added parameters and/or a function with parameters with a changed data type. For example, the parameter 804 in function 802 may be changed to an "int" data type in the second version of the software library 202.

Identifying changes to parameters of functions may include handling overloaded functions in the software library. Overloaded functions are functions with the same name that are use different parameter lists. The tool may match overloaded functions between the first version of the software library 102 and the second version of the software library 202. Overloaded functions that have direct matches between the two versions of the software library may be considered unchanged between these versions. Functions with the same name that do not have exact matches between the two versions of the software library may then be analyzed to link a previous version of a function to a new version of a function in a subsequent version of the software library.

For example, the function 802 may not have a direct match in the second version of the software library 202 in FIG. 8, and the function 806 may not have an exact match in the first version of the software library 102. The tool may determine that function 806 is a replacement for function 802 with a change in the parameter because the only difference is a single parameter change. Multiple overloaded function changes may be linked together between software versions by identifying functions that are most similar between the two software library versions. Additionally, metadata, comments, and/or documentation may be used to identify functions that directly replace previous functions when parameters are changed, added, and/or removed. For example, metadata, documentation, and/or comments may follow standard conventions that can be parsed by the tool to identify functions that have been deprecated, replaced, or changed using standard tags (e.g., "@deprecated").

Figure 9:
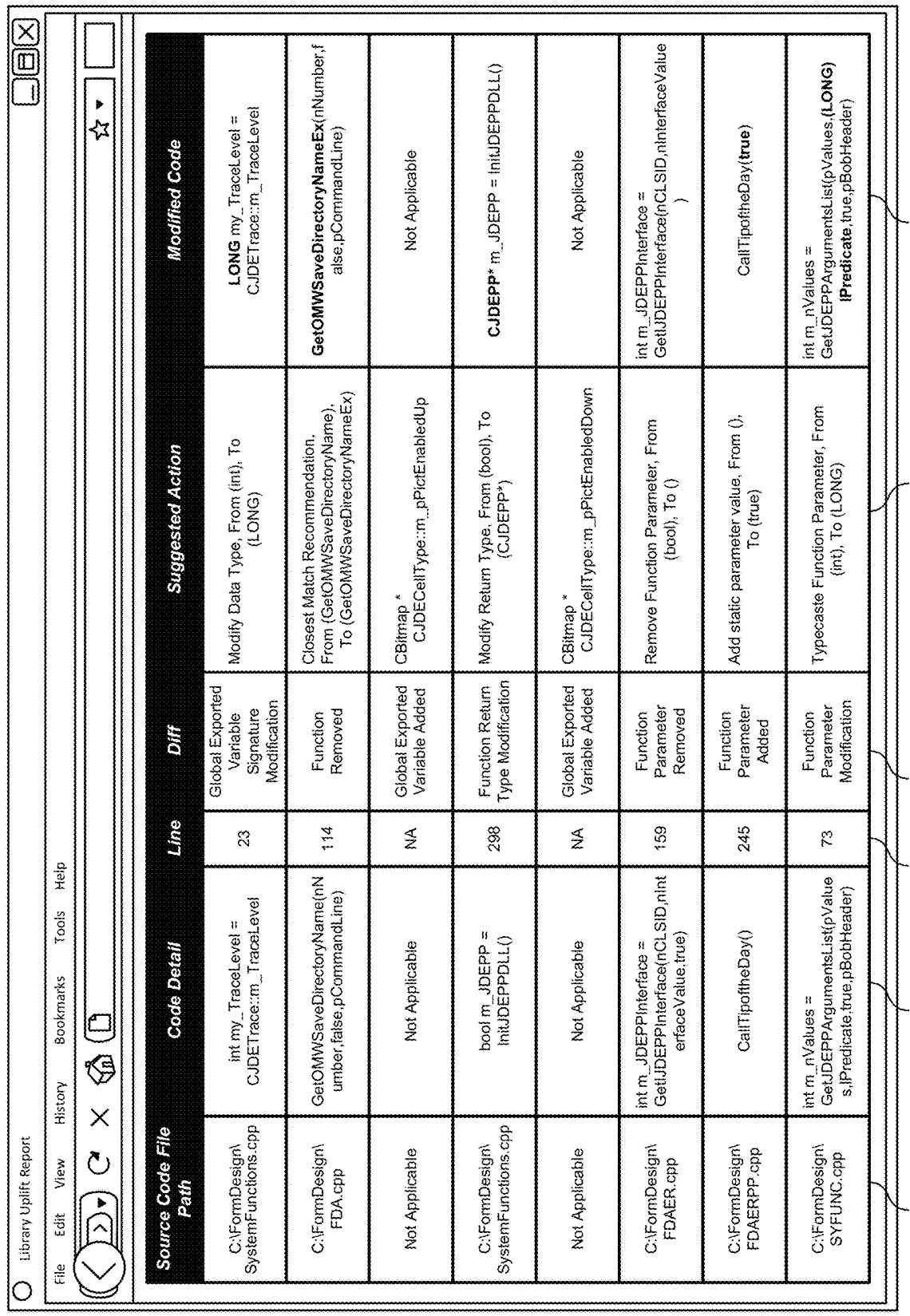
FIG. 9 illustrates a report generated by the library uplift tool, according to some embodiments.

FIG. 9 illustrates a report generated by the library uplift tool, according to some embodiments. This report may be generated as a PDF or other standardized document. Alternatively, the report may be generated as a display in a user interface. The example of FIG. 9 displays report in a browser window. The report may also be displayed in an app on a mobile device or in a standalone application on another computing device. The report may also be displayed as part of an analytic or diagnostic tool in a software environment, such as an enterprise software suite or a cloud computing environment.

After the tool identifies elements in the interface of the software library that have changed between the first version of the software library and the second version of the software library, the tool may access source code for a particular application that uses the first version of the software library. The tool may then search the source code files associated with the application to find any of the identified elements that have changed in the source code. For example, if a function has changed its parameter list between the first version of the software library and the second version of the software library, the tool may search the source code files associated with the application to find instances where the application source code calls that particular function from the software library. Thus, the search of the software code may be optimized by identifying changes in the software library versions beforehand, then searching based on those changes for specific instances in the application source code that may be affected by those changes. As described above, this is not a practical process to be done by hand, as software applications may include many thousands of lines of code distributed across many different source code files and libraries.

After identifying locations in the source code where the source code uses the elements that have changed, the report may be generated to synthesize those changes, their effect on the application source code, and how the application source code should be modified to make the application source code compatible with the second version of the software library. The interface may include an indication of a source code file path 902 that shows the particular source code file affected by a change. This may include any of the files that are compiled or interpreted for the software application, including user interface source code, algorithms, utilities, and so forth. This allows the report to show the specific source files among possibly hundreds of different source files that are affected by the change in the library version.

The report may also display an indication of the specific lines of code and programming language syntax 904 used in the application source file that are affected by the change between the versions of the software library. For reference, the report may also display a specific line number 906 that may be used if the developer opens a source code file for manual inspection. For example, a function that has changed in the software library may cause the report to display a line of code in the application source code that actually calls that function, including parameter values and assignments of the return value for the function as it is called. This allows the report to show the specific locations and syntax in the source files that may be problematic among the thousands of lines of code that may exist in each of the source files. By identifying and displaying a specific line of source code, this tool presents information in a user interface that was not previously available to application developers.

The report may also display a summary 908 of the difference between the elements that have changed between the first version of the software library and the second version of the software library. These summaries may be generated automatically as the changes identified by the tool using the algorithms described above. For example, when the data type of an exported variable changes between versions of the software library, the report may display a summary such as "Global Exported Variable Signature Modification." These summaries may be plain-English descriptions that are stored in a data structure in the tool. When a particular type of difference is identified as described above (e.g., a function parameter change, a function parameter addition, a data type change, a return type change, etc.), a corresponding description may be retrieved from the data structure and presented in the report. This provides new information to the software developer in the user interface. Instead of being required to analyze the source code in the application and both versions of the software library, the developer instead receives a summary of the changed elements without any analysis required. This also aggregates changes in multiple application source code files into a single report/display in the user interface.

The report may also display a suggested action 910. The suggested actions may be derived from templates that are stored by the tool. For instance, when detecting a change in a data type for a global variable, the template may include "Modified Data Type, From ([data_type_1]), To ([data_type_2])." The template may then be populated with values from the syntax of the interfaces of the first version of the software library and the second version of the software library accordingly. In this example, the placeholder variables data_type__1 and data_type__2 may be replaced with the values "int" and "LONG" from the syntax of the interfaces of the software library versions. FIG. 9 illustrates other suggested actions 910 that may be generated from templates and values in a similar manner. This aspect of the report not only provides new information to the user, it synthesizes the results of the analysis to provide a suggested action to take with the source code to make the source code compatible with the second version of the software library. This is information that the tool derives from the software library versions and the application source code that was not previously available to application developers in a unified user interface.

The report may also display an example of modified source code 912 that has been automatically modified according to the suggested action 910. This display may take the specific lines of code and programming language syntax 904 used in the application source file that are affected by the change in the versions of the software library and execute the suggested action 910. This may include typecasting return values from functions, typecasting or changing data types for variables, replacing function names with replacement functions, adding parameters including default values, removing parameters, typecasting parameters, and/or other modifications that would be generated by the suggested actions 910. The modified source code 912 displays the new source code that may replace the existing source code in the application source code file. Thus, the report illustrates how the suggested action 910 will be executed in the actual source code for the application. This allows developers to quickly assess the suggested actions to ensure that they are correctly implemented in the source code directly in the interface without separately opening and modifying the many different source files individually.

Figure 10:
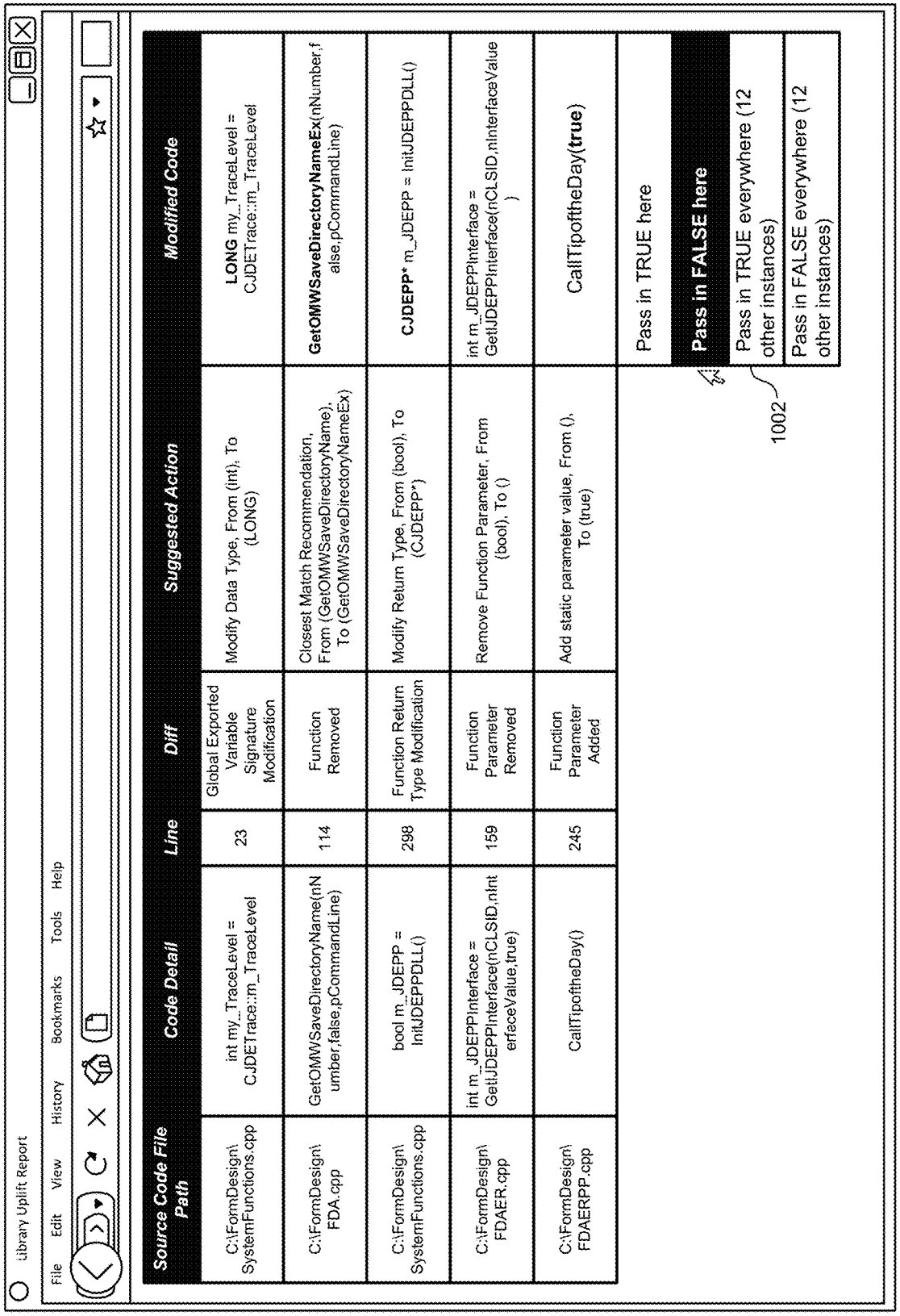
FIG. 10 illustrates how the report may be used to automatically propagate the modified source code from the report to the application source code, according to some embodiments.

FIG. 10 illustrates how the report may be used to automatically propagate the modified source code from the report to the application source code, according to some embodiments. The modified code 912 from FIG. 9 may be interactive. For example, a user may click on one of the specific indications of the modified code 912 to summon a menu of options for implementing the modified source code in the actual source code files. In the example of FIG. 10, the user may have clicked or otherwise selected the modified code for "CallTipoftheDay(true)." This input may have generated a menu 1002 of different options for implementing the modified code.

In this example, the modified code adds a parameter value to the function in the second version of the software library. The modified code generated by the suggested action in the report may include a default value that is inserted as a parameter. The default value may be generated after examining metadata, comments, or other documentation in the second version of the software library that may indicate a default value for the function that would maintain backwards compatibility with previous versions of the software library. In this example, the Boolean value of "true" is provided as a default value for the parameter added to the function. Options in the menu 1002 allow the developer to change the value that is added as a parameter to the function. The different values provided in the menu 1002 may include an enumerated list of possible values (e.g., true, false, etc.). For numerical or string values, the menu 1002 may include default values, as well as a field that allows the developer to enter a new value.

In addition to specifying new values that may be added to the source code, the menu 1002 may also include options regarding how the modified code should be propagated into the application source code as a whole. In the example FIG. 10, the row in the report selected by the developer refers to a single location in a single source file that is affected by the added parameter to the function. However, that function may be called in many different locations throughout the application source code files. The menu 1002 may include an option to replace the existing source code with the modified source code for this instance only. The menu 1002 may also include an option to replace the existing source code with the modified source code for every instance of the existing source code where this function is used. This allows the developer to provide a single input to make every use of the function in the application source code compatible with the second version of the software library. Other entries in the report for this same change may be removed from the report to simplify the remaining review process. This substantially reduces the time that it would normally take to modify the application source code to be compatible with a new version of the software library. Instead of requiring at least one modification for each instance of a changed library function/variable in all the of application source code files, only one modification may be needed for each change type in the library.

Also note that the report displayed in FIG. 10 has omitted some of the rows that were displayed previously in FIG. 9. The tool may present an option that allows the developer to filter results. In this example, the report has filtered out changes between the versions of the software library that do not affect the application source code. For example, the addition of new global variables provided by the second version of the software library may not impact the existing source code of the application. Although these rows were displayed in FIG. 9, they may be omitted through this filtering operation in FIG. 10. This allows the developer to focus explicitly on changes to the software library versions that affect the application source code directly.

FIG. 11 illustrates a report that may be generated without reference to the source code for a specific application, according to some embodiments. Instead, this report may be used to display the general differences between the first version of the software library and the second version of the software library. This may be particularly useful when there are intervening versions of the software library between first and second versions being considered by the tool. For example, if an application uses a software library, and that software library has not been upgraded through multiple versions, the developer may wish to upgrade to a most recent version without going through the process of incrementally upgrading through all of the previous versions. As described above, the documentation, metadata, and/or comments provided with the second version of the software library usually only includes references to an immediate previous version of the software library, and thus may not include changes that may be present between the first and second versions of the software library being considered.

This report illustrates differences between the two software library versions without requiring a comparison to application source code. Instead, the report may display indications of the libraries being considered 1102, 1108 and a summary 1106 of the changes detected between the two versions as described above. The report may include the syntax 1104 from the first version of the software library and the syntax 1110 from the second version of the software library. This report allows the tool to be used to analyze the differences between software libraries before determining whether any update should be made to any specific application source code. For example, this report may reveal that the changes are minimal between the two versions of the software library, and an upgrade may not be worth the time and effort to the developer.

Figure 12:
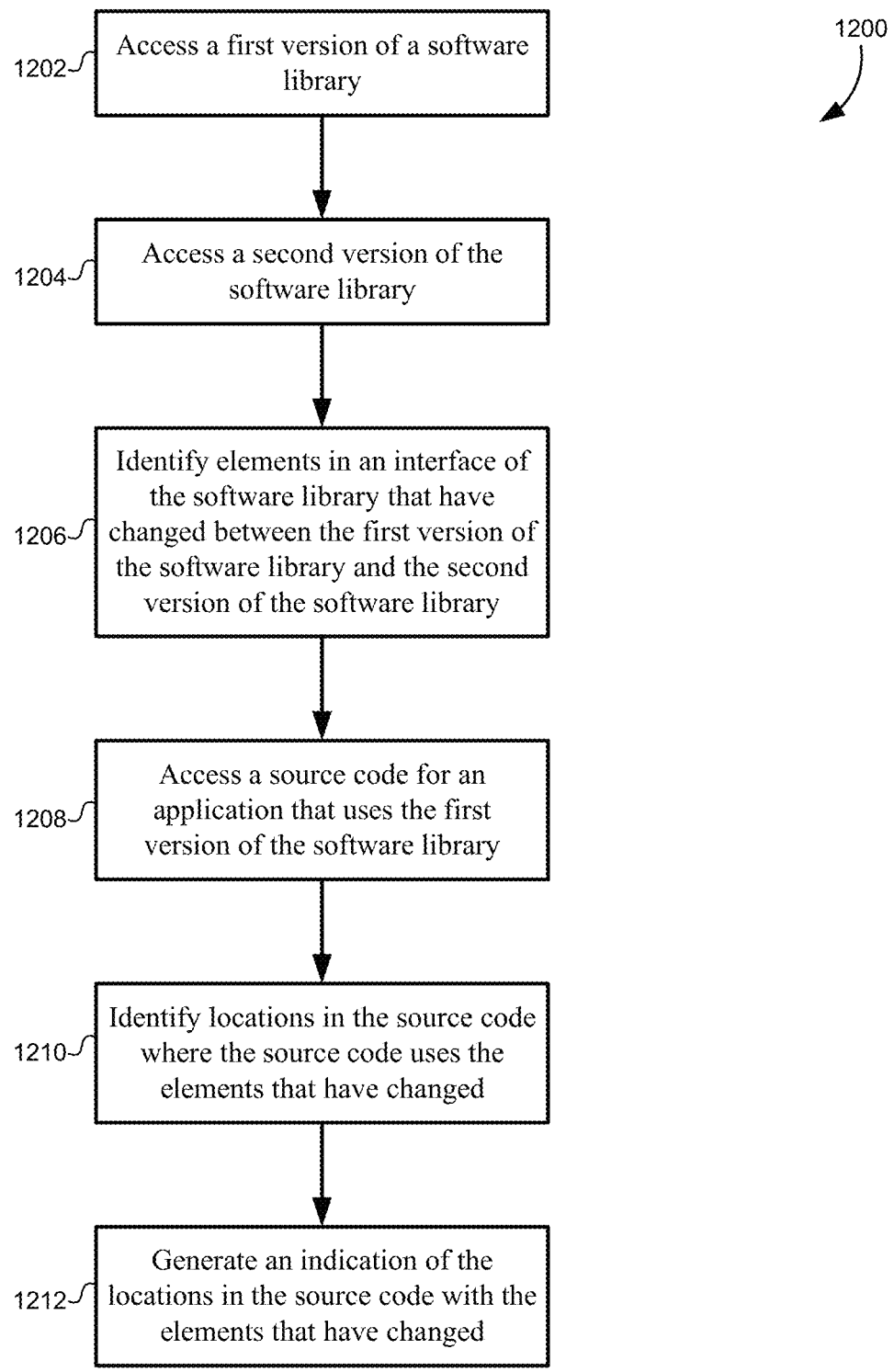
FIG. 12 illustrates a flowchart of a method for uplifting new versions of a software library for existing applications, according to some embodiments.

FIG. 12 illustrates a flowchart 1200 of a method for uplifting new versions of a software library for existing applications, according to some embodiments. This method may be executed using the library uplift tool described above. The method may include accessing a first version of the software library (1202) and accessing a second version of the software library (1204). These versions of the software library may be accessed as described above in relation to FIGS. 1-3 and elsewhere in this disclosure. The second version of the software library may represent an upgrade or later version of the first version of the software library. However, there may be one or more intervening versions of the software library between the first and second versions. The first version of the software library may be linked to an application's source code, and this method may be executed to replace the first version of the software library with the second version of the software library.

The method may also include identifying elements in an interface of the software library that have changed between the first version of the software library and the second version of the software library (1206). These changes may be identified as described above in relation to FIGS. 4-8 and elsewhere in this disclosure. For example, the tool may parse metadata provided with the second version of the application to identify deprecated or changed elements in the software library since the first version of the application. Elements may be retrieved and compared in the two versions using the different methods described above based on the programming language or operating environment of the software library versions. Changes may be identified by parsing and comparing function signature strings and/or symbols.

The method may additionally include accessing a source code for an application that uses the first version of the software library (1208) and identifying locations in the source code where the source code uses the elements that have changed (1210). The locations in the source code may be identified as described above in relation to FIGS. 9-11 and elsewhere in this disclosure. The tool may search for strings/symbols in the application source code files and identify the locations by line number.

The method may further include generating an indication of the locations in the source code with the elements that have changed (1212). The indications may be generated as part of a report, user interface, or other presentation method, such as the examples illustrated above in FIGS. 9-11 and elsewhere in this disclosure. The report may include indications of the elements of the interface of the software library to change, as well as indications of the locations in the source code that are affected by these changes. The report may be filtered to omit changes in the software library that are not present in the source code or that do not affect the source code. In some embodiments, the report may also generate a suggested action to be executed in the source code to make the source code compatible with the second version of the software library. The report may be interactive such that a developer may cause the actual source code to be modified in specific instances or throughout the source code files by adding values or otherwise modifying the source code.

It should be appreciated that the specific steps illustrated in FIG. 12 provide particular methods of uplifting new versions of a software library for existing applications according to various embodiments. Other sequences of steps may also be performed according to alternative embodiments. For example, alternative embodiments may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. Many variations, modifications, and alternatives also fall within the scope of this disclosure.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 13:
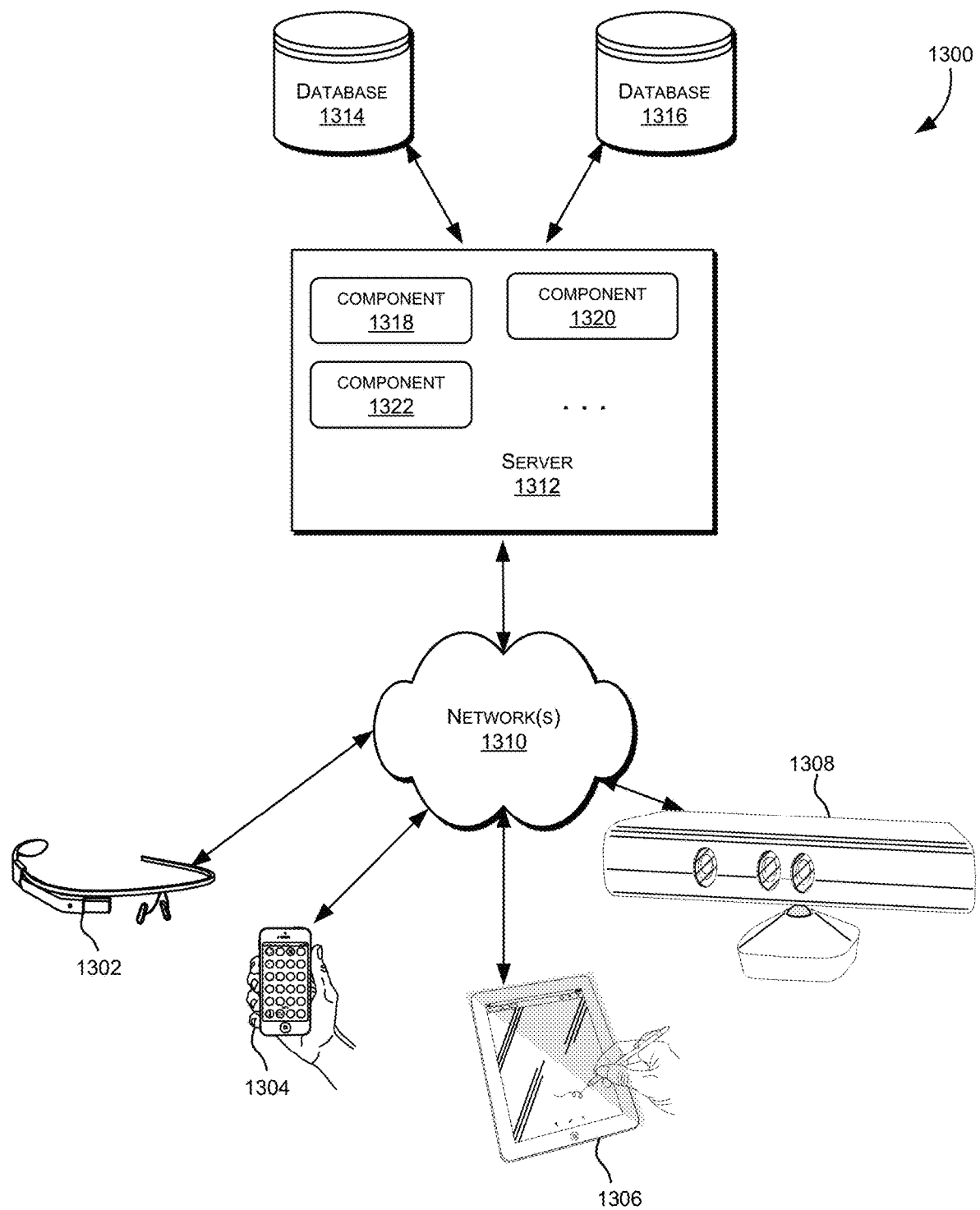
FIG. 13 illustrates a simplified block diagram of a distributed system for implementing some of the embodiments.

FIG. 13 depicts a simplified diagram of a distributed system 1300 for implementing one of the embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320 and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in the figure is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
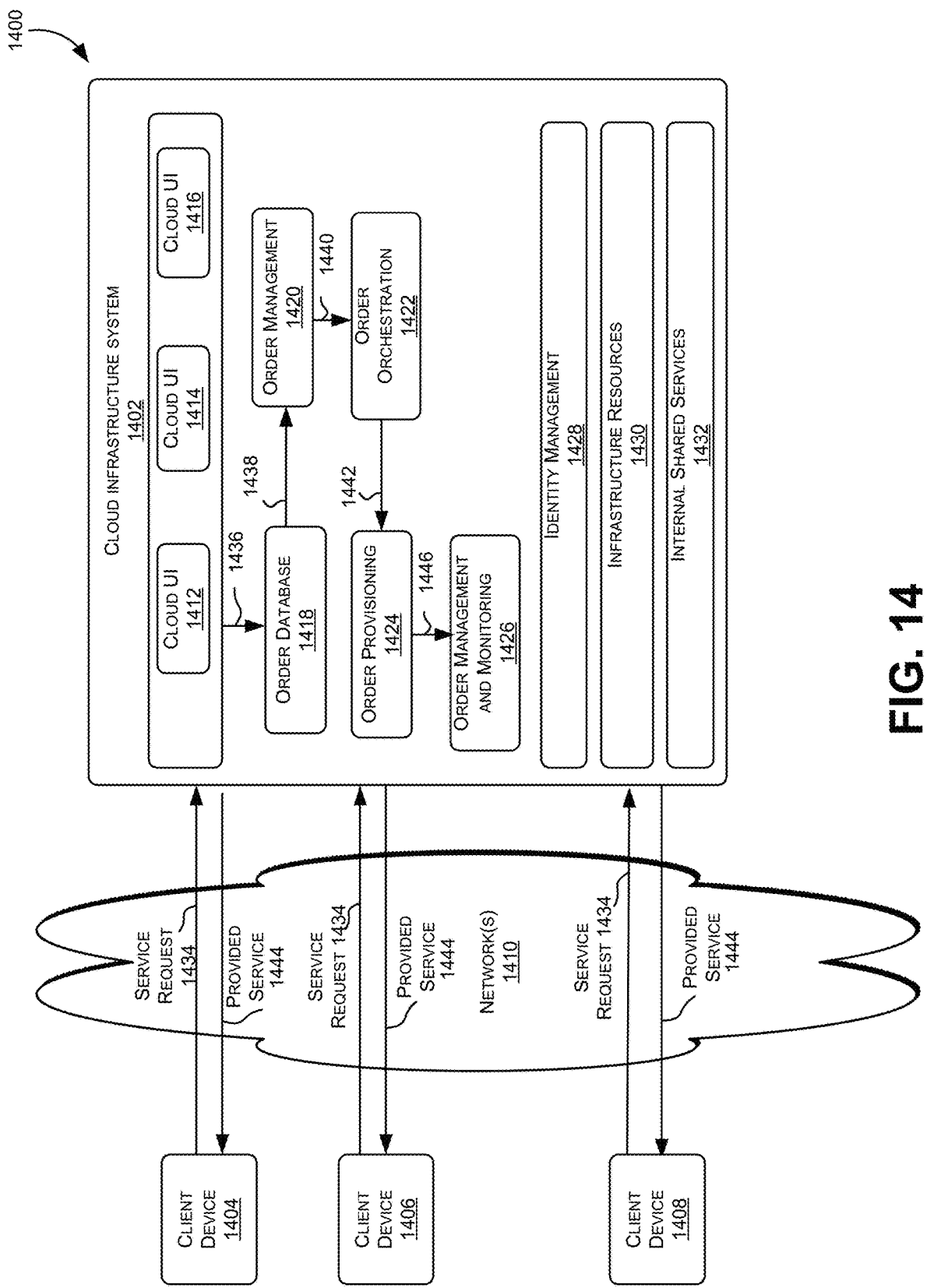
FIG. 14 illustrates a simplified block diagram of components of a system environment by which services provided by the components of an embodiment system may be offered as cloud services.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the system shown in the figure is only one example of a cloud infrastructure system that may incorporate some embodiments. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
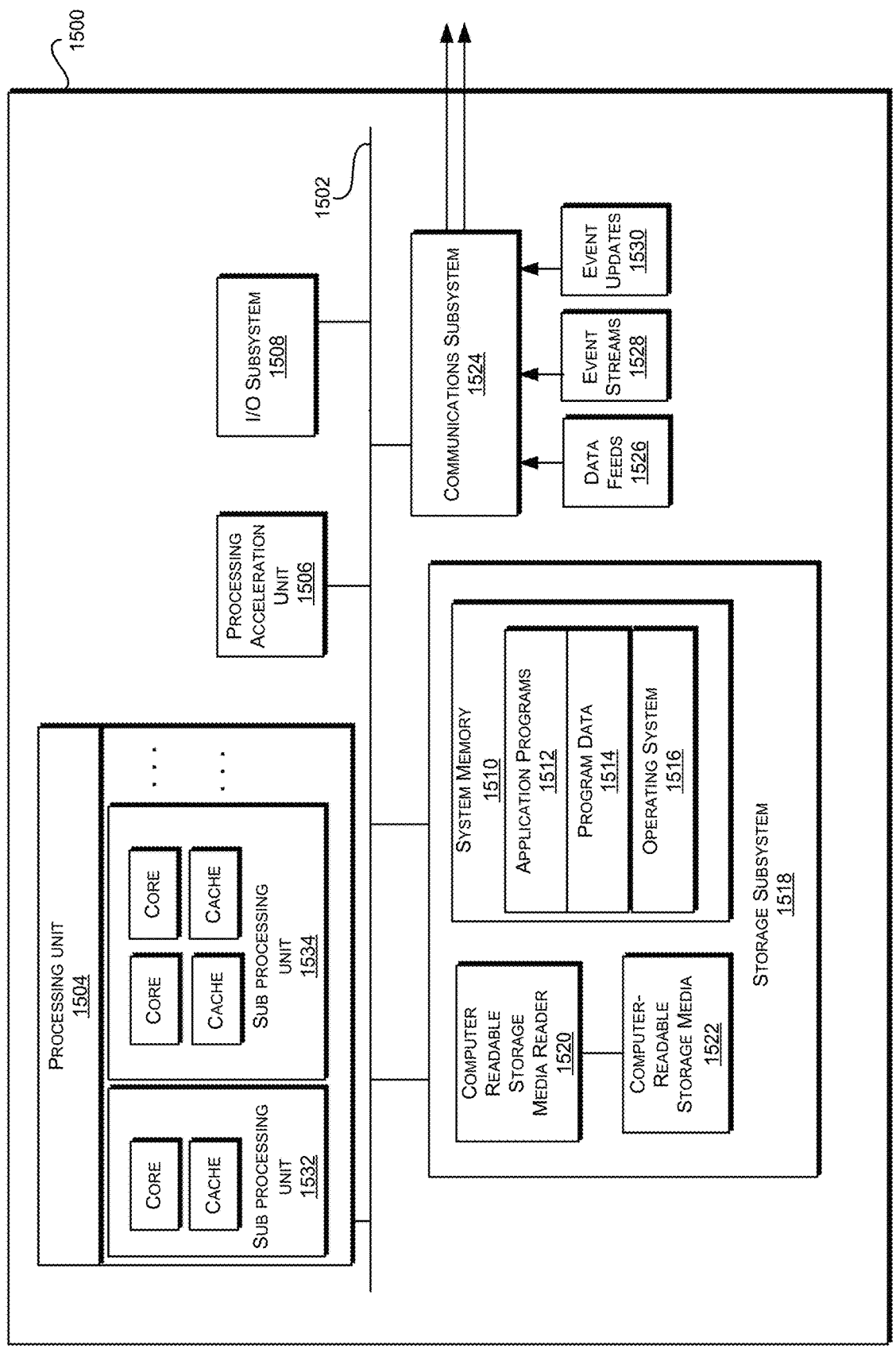
FIG. 15 illustrates an exemplary computer system, in which various embodiments may be implemented.

FIG. 15 illustrates an exemplary computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with some embodiments.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, other ways and/or methods to implement the various embodiments should be apparent.

In the foregoing description, for the purposes of explanation, numerous specific details were set forth in order to provide a thorough understanding of various embodiments. It will be apparent, however, that some embodiments may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of various embodiments will provide an enabling disclosure for implementing at least one embodiment. It should be understood that various changes may be made in the function and arrangement of elements without departing from the spirit and scope of some embodiments as set forth in the appended claims.

Specific details are given in the foregoing description to provide a thorough understanding of the embodiments. However, it will be understood that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, features are described with reference to specific embodiments thereof, but it should be recognized that not all embodiments are limited thereto. Various features and aspects of some embodiments may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   accessing a first version of a software library;
   accessing a second version of the software library;
   identifying elements in an interface of the software library that have changed between the first version of the software library and the second version of the software library;
   accessing a source code for an application that uses the first version of the software library;
   identifying locations in the source code where the source code uses the elements that have changed; and
   generating a report that displays of the locations in the source code where the source code uses the elements that have changed, wherein for each of the locations, the report displays:
       the location in the source code, together with a description of a corresponding change in the interface of the software library, and a suggested action to take in the source code to make the source code compatible with the second version of the software library.

2. The non-transitory computer-readable medium of claim 1, wherein the second version of the software library represents an upgrade or later version of the first version of the software library.

3. The non-transitory computer-readable medium of claim 2, wherein there are one or more intervening versions of the software library between the first version of the software library and the second version of the software library.

4. The non-transitory computer-readable medium of claim 1, wherein identifying the elements in the interface of the software library that have changed comprises:
   parsing metadata of the second version of the software library to identify deprecated or changed elements of the software library since the first version of the software library.

5. The non-transitory computer-readable medium of claim 1, wherein the source code for the application comprises managed code, and the operations further comprise:
   retrieving the elements in the interface of the software library using a class file disassembler or class reflection.

6. The non-transitory computer-readable medium of claim 1, wherein the source code for the application comprises unmanaged code, and the operations further comprise:
   retrieving the elements in the interface of the software library using an application programming interface (API) to access exported symbols of the software library.

7. The non-transitory computer-readable medium of claim 1, wherein the source code for the application comprises a scripting language, and the operations further comprise:
   retrieving the elements in the interface of the software library by extracting metadata of functions and variables from exported modules from script files.

8. The non-transitory computer-readable medium of claim 1, wherein identifying the elements in the interface of the software library that have changed comprises:
   comparing function signatures or variable declarations in the interface of the first version of the software library and the second version of the software library.

9. The non-transitory computer-readable medium of claim 1, wherein the elements in the interface of the software library that have changed comprise a changed data type of a constant or global variable of the software library.

10. The non-transitory computer-readable medium of claim 1, wherein the elements in the interface of the software library that have changed comprise a changed return type of a function of the software library.

11. The non-transitory computer-readable medium of claim 1, wherein the elements in the interface of the software library that have changed comprise a function that is added or removed in the software library.

12. The non-transitory computer-readable medium of claim 1, wherein the elements in the interface of the software library that have changed comprise an addition, deletion or change to a parameter of a function in the software library.

13. The non-transitory computer-readable medium of claim 1, wherein the report omits elements in the interface of the software library that have changed that are not present in the source code.

14. The non-transitory computer-readable medium of claim 1, wherein the report further displays modified source code that has been automatically modified according to the suggested action.

15. The non-transitory computer-readable medium of claim 14, wherein the report further comprises a control that receives an input indicating that the suggested action should be taken such that the modified source code is written back to the source code.

16. The non-transitory computer-readable medium of claim 14, wherein the report further comprises a control that receives an input indicating that the suggested action should be taken for multiple instances in the source code such that the modified source code is written back to the source code for the multiple instances.

17. The non-transitory computer-readable medium of claim 1, wherein the report further comprises a control that receives an input indicating a value that should be provided as a parameter to a function call.

18. The non-transitory computer-readable medium of claim 1, wherein the report further comprises a control that receives an input of a user selection of a change to the source code from among a plurality of suggested changes.

19. A method of uplifting new versions of software libraries for existing applications, the method comprising:
   accessing a first version of a software library;
   accessing a second version of the software library;
   identifying elements in an interface of the software library that have changed between the first version of the software library and the second version of the software library;
   accessing a source code for an application that uses the first version of the software library;
   identifying locations in the source code where the source code uses the elements that have changed; and
   generating a report that displays of the locations in the source code where the source code uses the elements that have changed, wherein for each of the locations, the report displays:
       the location in the source code, together with a description of a corresponding change in the interface of the software library, and a suggested action to take in the source code to make the source code compatible with the second version of the software library.

20. A system comprising:
one or more processors; and
one or more memory devices comprising instructions that, when executed by the one or more processors, cause the one or more processors to perform operations comprising:
   accessing a first version of a software library;
   accessing a second version of the software library;
   identifying elements in an interface of the software library that have changed between the first version of the software library and the second version of the software library;
   accessing a source code for an application that uses the first version of the software library;
   identifying locations in the source code where the source code uses the elements that have changed; and
   generating a report that displays of the locations in the source code where the source code uses the elements that have changed, wherein for each of the locations, the report displays:
      the location in the source code, together with a description of a corresponding change in the interface of the software library, and a suggested action to take in the source code to make the source code compatible with the second version of the software library.

* * * * *

UNITED STATES PATENT AND TRADEMARK OFFICE
CERTIFICATE OF CORRECTION

| | |
|---|---|
| PATENT NO. | : 11,500,618 B2 |
| APPLICATION NO. | : 17/128611 |
| DATED | : November 15, 2022 |
| INVENTOR(S) | : Rodgers et al. |

It is certified that error appears in the above-identified patent and that said Letters Patent is hereby corrected as shown below:

On the Title Page

Column 2, under Abstract, Line 2, delete "elements of an" and insert -- elements --, therefor.

In the Claims

In Column 28, Line 1, in Claim 9, delete "Thanks! the non-transitory" and insert -- The non-transitory --, therefor.

Signed and Sealed this
Twentieth Day of June, 2023

*Katherine Kelly Vidal*

Katherine Kelly Vidal
*Director of the United States Patent and Trademark Office*